United States Patent [19]
Oki et al.

[11] Patent Number: 4,818,981
[45] Date of Patent: Apr. 4, 1989

[54] ACTIVE MATRIX DISPLAY DEVICE AND METHOD FOR DRIVING THE SAME

[75] Inventors: Ken-ichi Oki; Satoru Kawai, both of Zama; Ken-ichi Yanai, Atsugi; Kazuhiro Takahara, Kawasaki, all of Japan

[73] Assignee: Fujitsu Limited, Kawasaki, Japan

[21] Appl. No.: 95,268

[22] Filed: Sep. 11, 1987

[30] Foreign Application Priority Data

| Sep. 11, 1986 | [JP] | Japan | 61-212696 |
| Sep. 11, 1986 | [JP] | Japan | 61-212697 |
| Dec. 25, 1986 | [JP] | Japan | 61-307750 |
| Jan. 12, 1987 | [JP] | Japan | 62-003348 |
| Mar. 17, 1987 | [JP] | Japan | 62-060168 |

[51] Int. Cl.$^4$ ............................................. G09G 3/36
[52] U.S. Cl. ................................ 340/784; 350/333; 340/805
[58] Field of Search .............. 340/784, 811, 805, 718, 340/719; 350/332, 333

[56] References Cited

U.S. PATENT DOCUMENTS

| 3,896,430 | 7/1975 | Hatsukano | 340/811 |
| 3,995,942 | 12/1976 | Kawakami et al. | 340/784 |
| 4,062,626 | 12/1977 | Kawakami et al. | 340/784 |
| 4,112,333 | 9/1978 | Asars et al. | 350/333 |
| 4,404,555 | 9/1983 | Long et al. | 340/811 |
| 4,556,880 | 12/1985 | Hamada | 340/784 |
| 4,717,244 | 1/1988 | Hilsum et al. | 350/333 |

FOREIGN PATENT DOCUMENTS

| 0198954 | 10/1986 | European Pat. Off. | 340/784 |
| 2133602 | 12/1982 | United Kingdom | 340/784 |

Primary Examiner—John W. Caldwell, Sr.
Assistant Examiner—Alvin Oberley
Attorney, Agent, or Firm—Staas & Halsey

[57] ABSTRACT

An active matrix display device of an improved and simplified configuration and a driving method for the same are disclosed. The display device according to the present invention is characterized in that data bus lines and scan bus lines are separately formed on first and second transparent substrates respectively and the drain electrode of each TFT on the second substrate is connected to the scan bus line to be addressed next. This configuration eliminates earth bus lines of the prior art. This arrangement has effects of simplifying a bus line design and obtaining a higher yield and an increased opening rate for each display element. In order to drive the above device, an address pulse having a stepped waveform is used. Each address pulse has Vgon, Vgc, and Vgoff levels, and a width of two horizontal scan time. The first step of address pulse Vgc corresponds to the address time of the adjacent scan bus line to be scanned previously; and the second step Vgon corresponds to the address time for the TFT to be scanned. The present invention discloses a voltage relation for waveforms of the address pulse and data pulse in order to obtain a high quality display.

20 Claims, 19 Drawing Sheets

ACTIVE MATRIX DISPLAY DEVICE AND METHOD FOR DRIVING THE SAME

BACKGROUND OF THE INVENTION

1. Field of the Invention

This invention relates to the active matrix display device in which data bus lines are formed on a first transparent insulating substrate such as a glass panel and scan bus lines are formed on a second transparent insulating substrate, eliminating a grade-crossing of both bus lines on the same panel, and the method for driving the same.

More specifically, this invention concerns the active matrix display device in which the earth bus lines on the second substrate are further eliminated resulting in enlarging a relative display area per pixel (picture element) and obtaining a higher yield of panel fabrication. And further, this invention relates to the driving method for obtaining a high quality display, reducing a cross-talk problem.

2. Description of the Prior Art

An active matrix display device, together with a dot matrix type (or so-called simple matrix type), is widely used in a display terminal of information processing apparatus. Liquid crystal is usually enclosed in such devices as the display medium.

In the active matrix display device, each pixel once addressed maintains an active state until the next scan, therefore this type has advantages of avoiding reduction of contrast and angle of visibility such as would happen ordinarily for the dot matrix type.

FIG. 1 shows an equivalent circuit of the active matrix display device of the prior art. A thin film transistor (abbreviated as TFT hereinafter) 31 is used as an active switch element. TFT 31 provides gate electrode 32, drain electrode 33, and source electrode 34. Source electrode 34 is connected to display electrode of liquid crystal display element 35. Both scan bus lines 36 and data bus lines 37 are formed on the second transparent insulating substrate and two bus lines 36 and 37 are perpendicular with each other.

Liquid crystal display element 35 consists of two display electrodes and liquid crystal medium held therebetween. One display electrode is formed on the second substrate and connected to source electrode 34 of TFT 31, and the common earth electrode formed on the first substrate is utilized as another display electrode. Gate electrode 32 is connected to scan bus line 36, and drain electrode 33 is connected to data bus line 37.

TFT 31, one display electrode of liquid crystal display element 35, scan bus line 36, and data bus line 37 are formed on the second substrate such as a glass panel, and common display electrode is formed on the first substrate, and two substrates are sealed together at their peripheral regions, having a small distance apart and enclosing the liquid crystal medium.

By applying address pulses sequentially having such as 30 to 60 μs pulse width, to scan bus line 36 and applying data pulses to each data bus line 37 synchronized with the above address pulse, the information is thus transmitted to each liquid crystal display element 35 arrayed in a row and is maintained for subsequent one frame period.

Next, the above performance is explained in more details. When the scan bus line 36 is addressed, TFT 31, wherein gate electrode 32 is connected to said scan bus line, is turned on, and thus data voltage is impressed to liquid crystal display element 35 through data bus line 37 and TFT 31, and the electro-static capacitance of liquid crystal display element 35 is charged up. The above liquid crystal display element can maintain the information by the charged voltage after TFT 31 is turned off. When the scan bus line 36 is addressed next time, the liquid crystal display element 35 is newly charged up corresponding to the new information.

In the active matrix display device above described, scan bus line 36 and data bus line 37 are formed insulated from each other and perpendicular to each other on the same substrate. Therefore, degradation of insulation or a short between two bus lines at the crossing point is often observed. In this case, it results in a line fault of display extending along the bus line, and the yield in fabrication is liable to fall because of the crossed bus line structure.

A step is formed for the upper bus line at the crossing point, the step having a height of total thickness of the lower bus line and an insulating layer. As a result, the upper bus line is liable to faults such as an increased resistance or a breakage thereof.

There are other problems to be solved for the above structure. Because scan bus lines 36 and data bus lines 37 are formed on the same glass panel, an opening rate, which is defined as a ratio of each display electrode area to each pixel area, is reduced.

To solve the above problem, the improved design has been proposed, which is disclosed in French patent Publication No. 2,553,218 by A. Chevenas-Paule and J. Frederic-Clerc, or Japanese Patent Tokugansho 60-274011 by K. Oki, S. Kawai, etal. FIG. 2 shows the equivalent circuit of the proposed design. On a first glass panel, data bus line 37 is formed as a common display electrode of liquid crystal display element 35. On a second glass panel, TFT 31, scan bus line 36 and another display electrode are formed, wherein gate electrode 32 is connected to scan bus line 36, drain electrode 33 is connected to the display electrode of liquid crystal display element 35, and source electrode is connected to a common earth bus line. Liquid crystal medium is held between two glass panels.

Though the directions of scan bus line 36 and data bus line 37 are perpendicular to each other, they are formed on separate panels. Therefore there is no problem such as insulation between scan bus line 36 and data bus line 37 and the step problem at the crossing point of the upper bus line encountered in FIG. 1 type.

The improved design of FIG. 2 can reduce defects caused in bus line formation and rise the fabrication yield. Though this type of design eliminates the crossing points of bus lines on the same glass panel, however, it necessitates a formation of additional earth bus lines parallel with scan bus lines 36 on the second glass panel, each source electrode 34 of TFT 31 is connected to this earth bus line. Therefore, the opening rate can not be increased large enough.

SUMMARY OF THE INVENTION

As described above, the active matrix display device leaves much room for further improvement, even when scan bus lines and data bus lines are formed on separate glass panels, because earth bus lines are to be formed on the glass panel together with scan bus lines.

Therefore, it is a general object of the present invention t provide the active matrix display device, wherein a larger opening rate of display element can be obtained.

It is a further object of the invention to provide the active matrix display device, by which a better production yield can be obtained.

It is a still further object of the invention to provide the active matrix display device and the method for driving the same, wherein faults of the device during operation is minimized and the high reliable operation is maintained.

It is still further object of the invention to clarify the voltage relation and the waveforms of the address pulses and data pulses for obtaining good display quality.

The fundamental structure of the present invention can be explained using the equivalent circuit shown in FIG. 3. Switch element 1 such as TFT (its position is denoted typically as TFTmn), one of display electrodes of liquid crystal display element 5 and scan bus lines 6 such as SLn−1, Sn, SLn+1 and SLn+2 are formed on the second glass panel. Data bus lines 7 (line number is denoted typically as DLm) and another display electrode of liquid crystal display element 5 are formed on the first glass panel. Control electrode 2 (gate electrode) is connected to scan bus line 6; one controlled electrode 3 (source electrode), to the second display electrode of liquid crystal display element 5; and another controlled electrode 4 (drain electrode), to adjacent scan bus line 6. Two glass panels are sealed together forming an enclosure and holding liquid crystal medium therebetween.

The above design configuration of the second glass panel eliminates the formation process of earth bus lines of the prior art, and simplifies bus line structure. And this contributes to increase the opening rate.

In driving the display device, address pulses Vg1, Vg2 and Vg3, such as shown on the left side of FIG. 3, are sequentially impressed on scan bus lines SLn−1, SLn and SLn+1. Each address pulse has a stepped waveform, having first and second (top) steps from the base level. While the scan bus line is not addressed, it is maintained at Vgoff (base) level. When scan bus line SLn−1 is addressed, second step level Vgon of address pulse Vg1 is impressed to control electrode 2 of switch element 1 connected to the scan bus line SLn−1, and further at that moment, first step level Vgc of address pulse Vg2 is impressed on scan bus line SLn, and these voltage levels of address pulses are maintained for one scan period. For each scan period, each data bus line DLm is simultaneously subject to data pulses such as Vd1, Vd2 shown on the upper side of FIG. 3.

When the scan period of Vgon for scan bus line SLn−1 is over, control electrode 2 of switch element 1 connected to SLn−1 is driven to Vgoff and switch element 1 is turned off. However, the charged voltage Va between two display electrodes of liquid crystal display element 5 is maintained due to an electro-static capacitance thereof, and display element 5 is active for one frame period until the next scan.

The reason for using the stepped waveform as address pulse is that the scan bus lines 6 have two functions of that one scan bus line turns on the switch element 1 and the next scan bus line maintains the controlled electrode 4 thereof at the specified voltage Vgc during the scan period, Vgc being different from non-addressed voltage Vgoff.

And moreover, generally liquid crystal display element 5 is used in a manner that the polarity of impressed voltage is reversed every time when scanned. This invention discloses voltage of address pulse is determined to satisfy the following relation;

$$Vgc - Vgoff \geq 2Va - Vth,$$

wherein Vth denotes threshold voltage of switch element 1; and Va, amplitude of data voltage.

The present invention further discloses several modifications of the structure of scan bus lines and the associated connection line from the drain electrode to scan bus line. Scan bus lines on the second glass panel may be formed using a double layer structure sandwiching an insulating layer, and the lower and upper layers can be connected in a few ways. This type of the structure is useful to improve the characteristics of the display device and simplify the fabrication process.

With regard to the driving method of display device, the present invention discloses further the method of reversing the polarity of data voltage every horizontal scan in addition to reversing it every frame. This method helps to prevent the uneven contrast and to obtain stable contrast gradient.

Further objects and advantages of the present invention will be apparent from the following description, reference being had to the accompanying drawings wherein preferred embodiments of the present invention are clearly shown.

DETAILED DESCRIPTION OF THE PREFERRED EMBODIMENTS

Figure 1:
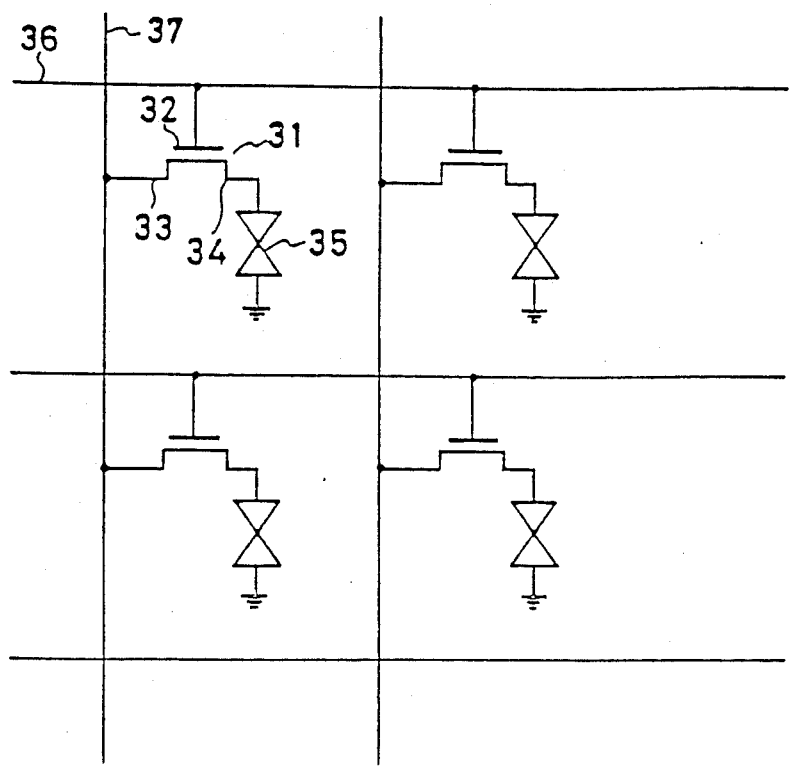
FIG. 1 shows an equivalent circuit of the active matrix display device of the prior art.
Figure 2:
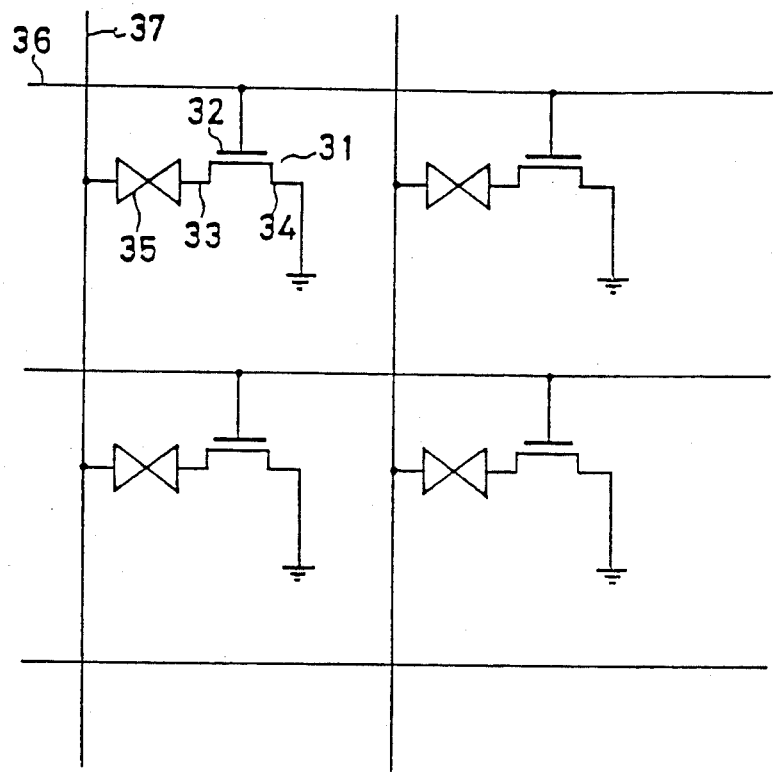
FIG. 2 shows another equivalent circuit of the active matrix display device of the prior art.
Figure 3:
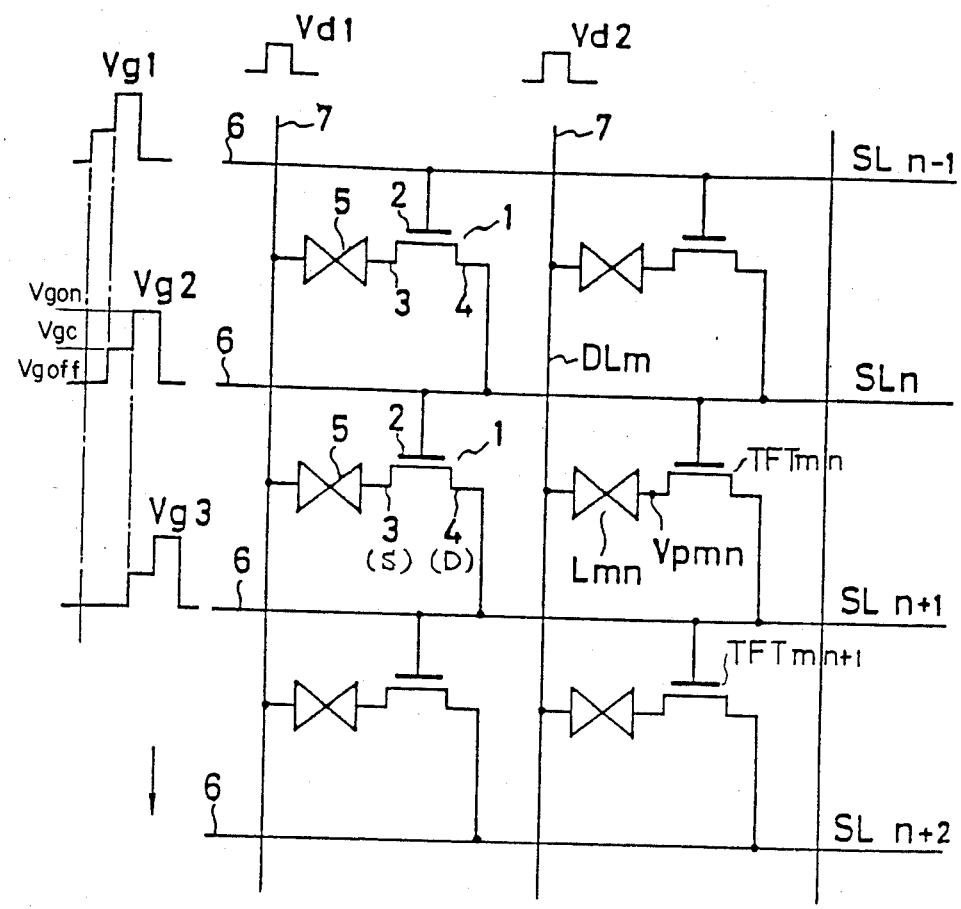
FIG. 3 shows an equivalent circuit and related waveforms according to the present invention for explaining the principle of the invention.

The equivalent circuit of the present invention has been previously disclosed in FIG. 3. Further detailed structure is explained using FIG. 3 and FIG. 4 which shows an exploded perspective view of an embodiment according to the present invention.

Switch element 1 such as TFT, scan bus line 6, and display electrode 8 of display element 5 are formed on a second glass panel 9, and data bus line 7 is formed on a first glass electrode 10 and it functions as another common display electrode. Between display electrode 8 and data bus line 7, liquid crystal medium is held, forming display element 5.

Figure 4:
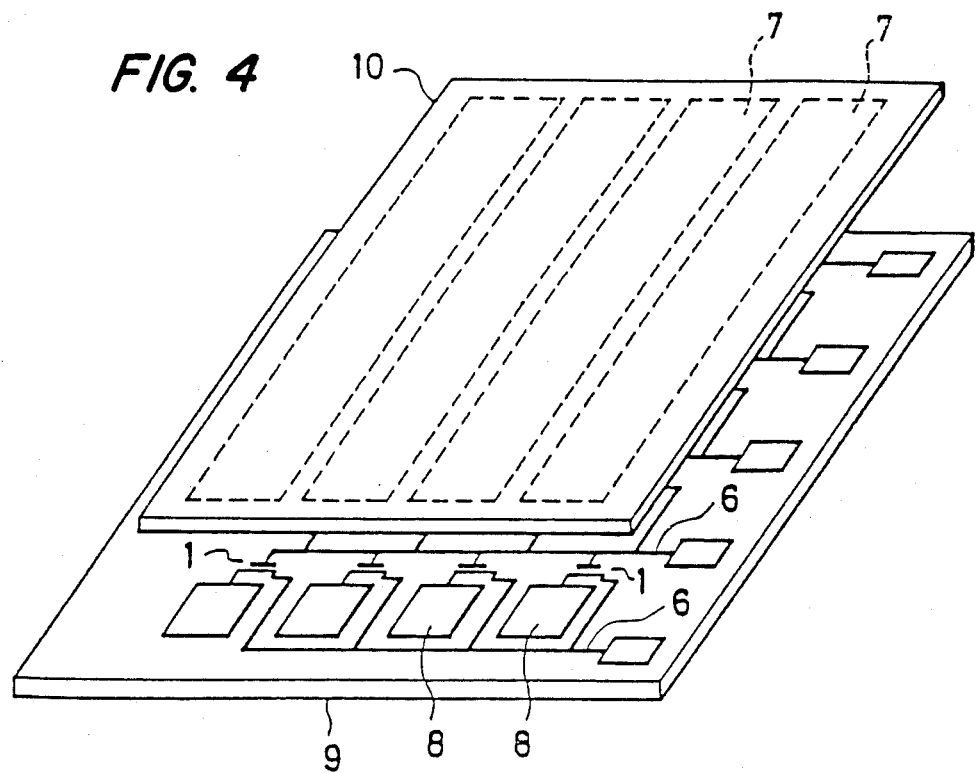
FIG. 4 shows an exploded perspective view of the display device of an embodiment of the present invention.

Connections of switch element 1 are shown in FIGS. 3 and 4, wherein display electrode 8 is connected to one controlled electrode 3 of switch element 1, control electrode 2 of switch element 1 is connected to scan bus line 6 (SLn−1), and another controlled electrode 4 of switch element 1 is connected to adjacent scan bus line 6 (SLn). In operation, the scan bus line SLn having connection to the controlled electrode 4 of switch element 1 is scanned just after the scanning of scan bus line SLn−1 to which the control electrode 2 of the switch element 1 is connected.

As seen from FIG. 4, scan bus line 6 and data bus line 7 are formed on separate panels 9 and 10 respectively, therefore, there is no grade-crossing and insulation problem, resulting in an increase of production yield. And further, bus lines on the second panel are simplified, and this increases the opening rate.

As for the switch element 1 of the active matrix display device using liquid crystal medium, TFT is generally used. In this case, gate electrode is used as control electrode 2 of switch element 1; source electrode, as controlled electrode 3; and drain electrode, as another controlled electrode 4.

Figure 5:
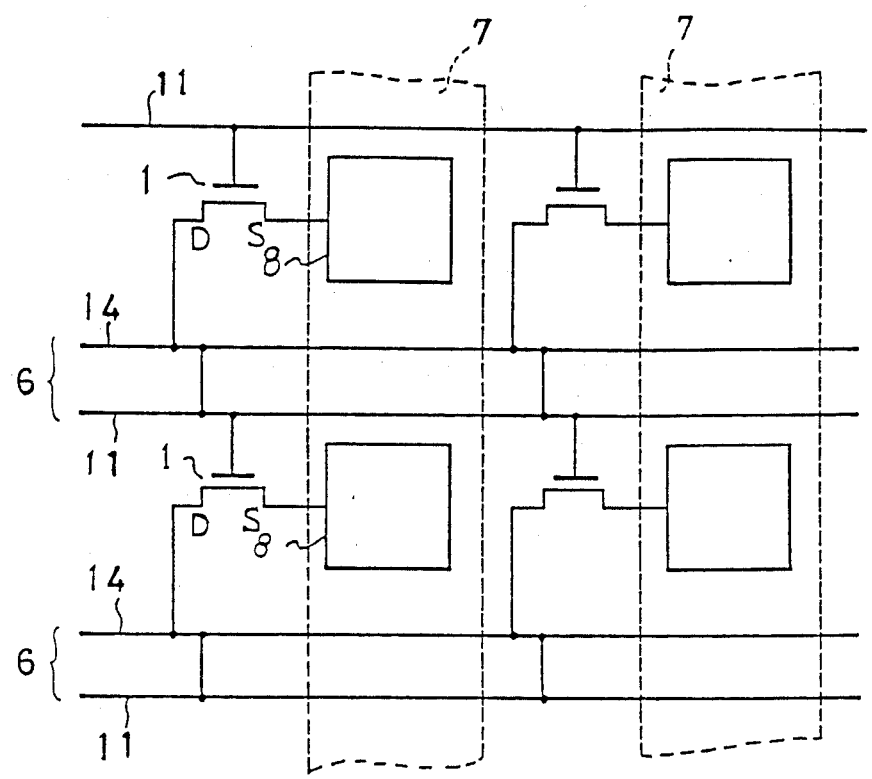
FIG. 5 shows an equivalent circuit according to the present invention for explaining a double layer bus line.

In the above explanation of FIGS. 3 and 4, controlled electrode 4 is connected to scan bus line 6. However, several modifications are possible in actual fabrication. Scan bus lines nd drain bus lines (conventionally so-called) are separately formed, wherein the horizontal portions of one group of bus lines can be formed on another group, forming a double layer structure. If proper connections are provided between these two layers, it functions just as the equivalent circuit shown in FIG. 3, and it is schematically shown in FIG. 5. Double layer structure has merits of obtaining a large opening rate, realizing lower resistance of scan bus line and obtaining redundancy thereof.

The drain bus line 14 in FIG. 5 can be formed simultaneously together with display electrode 8, source electrode S, and drain electrode D with its extension line therefrom, using transparent conductive material. On the other hand, scan bus line 11 is subsequently formed by metalization process, having an insulating layer therebetween. Connections between the transparent conductive layer and metalization layer, are achieved by partial removal of the insulating layer under the scan bus line 11.

Figure 6:
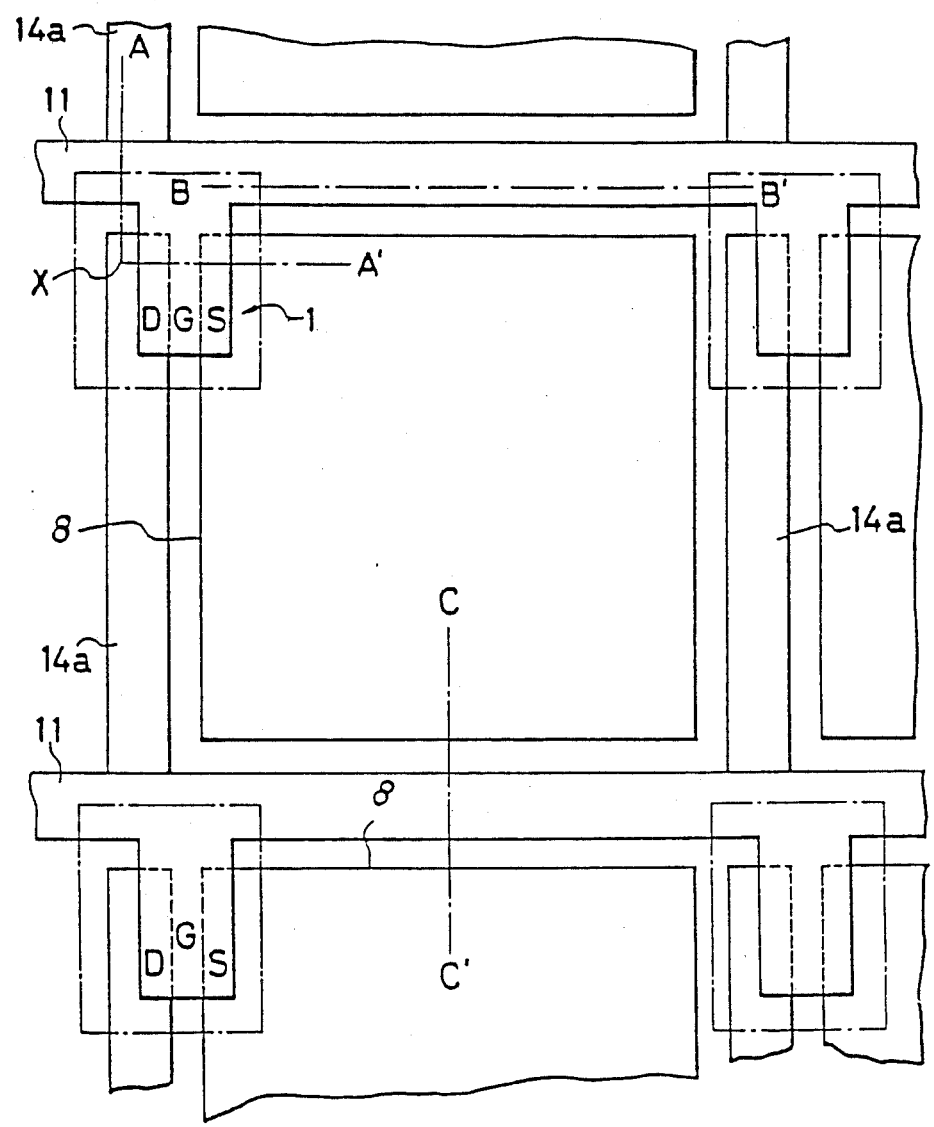
FIG. 6 shows a plan view of the electrode and bus line arrangement on the second panel of the present invention.

FIG. 6 shows a plan view of a typical and fundamental configuration of electrode arrangement on the second panel of the present invention. Display electrode 8 and source electrode S are formed as an unified plane electrode, and drain electrode D and its extension line 14a are also formed as one strip-shaped electrode. All these electrodes are formed using transparent conductive material typically known as ITO (Indium Tin Oxide).

Region enclosed by dot-dash-line means that TFT 1 is formed in this area. On drain electrode D and source electrode S, amorphous silicon and insulating layers are deposited and patterned for this area, and next scan bus line 11 together with gate electrode G is formed by metalization process using such as aluminum material. Connection between extension line 14a and scan bus line 11 is made by directly depositing metal layer of scan bus line 11 on the end portion of extension line 14a.

Figure 7:
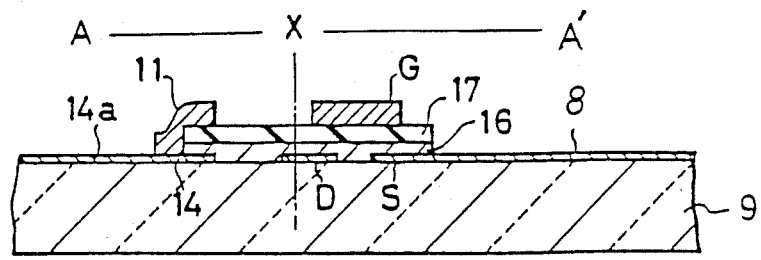
FIGS. 7 through 9 cross-sectional views taken along lines A—A', B—B', and C—C' respectively in FIG. 6.

Cross-sectional view taken along two dot-dash-lines A-X-A' forming right angle is shown in FIG. 7. In the figure, amorphous silicon layer 16 deposited on drain electrode D and source electrode S, insulating layer 17 made of silicon oxide or silicon nitride, and gate electrode G form stagger-type TFT 1.

The electrode configuration on the first glass panel is comparatively simple, therefore, detailed illustration is omitted. Data bus line 7 of transparent conductive material is formed on glass panel 10 and its direction is vertical to that of scan bus line 6 (11) as shown schematically in FIG. 4. Liquid crystal medium is held between display electrode 8 and data bus line 7, forming a display element.

The structure of the present invention includes no grade-crossing of data and scan bus lines on glass panel 9, and no separately formed earth bus line in the prior art, therefore, large opening rate can be obtained.

As explained previously, modification of design especially with regard to the connection of extension line 14a to scan bus line is possible.

Figure 8:
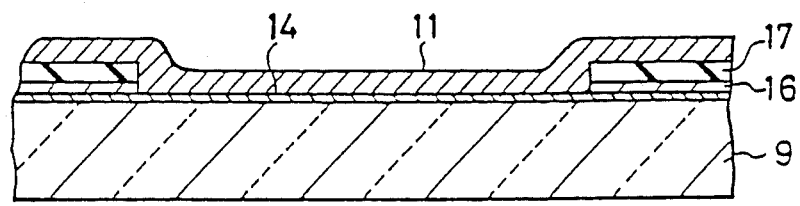
Figure 9:
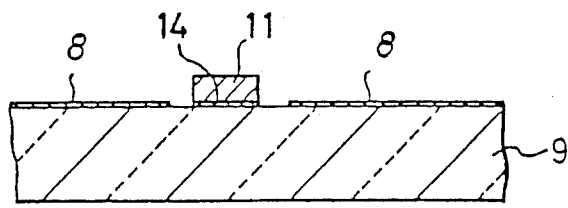

The first modification is embodied in that the extension lines 14a are formed together with drain bus line which constitutes a lower layer of double layer structure, and the structure is shown in FIGS. 8 and 9. FIG. 8 shows a cross-sectional view taken along line B—B' of FIG. 6; and FIG. 9, along line C—C'. Drain bus line 14 is simultaneously formed and patterned together with extension line 14a. Amorphous silicon layer 16 and insulating layer 17 are removed except the area for the TFT 1 region. Therefore, scan bus line 11 can be formed directly on drain bus line 14 for a comparatively long distance with regard to each pixel. Scan bus line 11 and drain bus line 14 are combined and form scan bus line 6.

Though the drain bus line 14 is formed separately from scan bus line in this modification, it is formed within the same pattern area of scan bus line 11 forming the double layer structure, therefore, the same opening rate as that of the device without drain bus line, can be obtained.

In fabricating the panel structure shown in FIGS. 6 to 9, three steps of photolithographic patterning processes are required;
(1) patterning transparent conductive layer for forming display electrode 8, source electrode S, drain electrode D, extension line 14a including drain bus line 14 if necessary,
(2) patterning amorphous silicon layer 16 and insulating layer 17 for forming active region of TFT 1 and exposing the surface of drain bus line 14, and
(3) patterning metal layer for forming gate electrode G and scan bus line 11.

Step (2) is necessary to form the double layer structure of scan bus line, thereby two layers are connected together for each pixel.

In the second modification of scan bus line design, above patterning step (2) is omitted. Therefore the fabrication processes are very simplified, requiring only two patterning steps.

Figure 10:
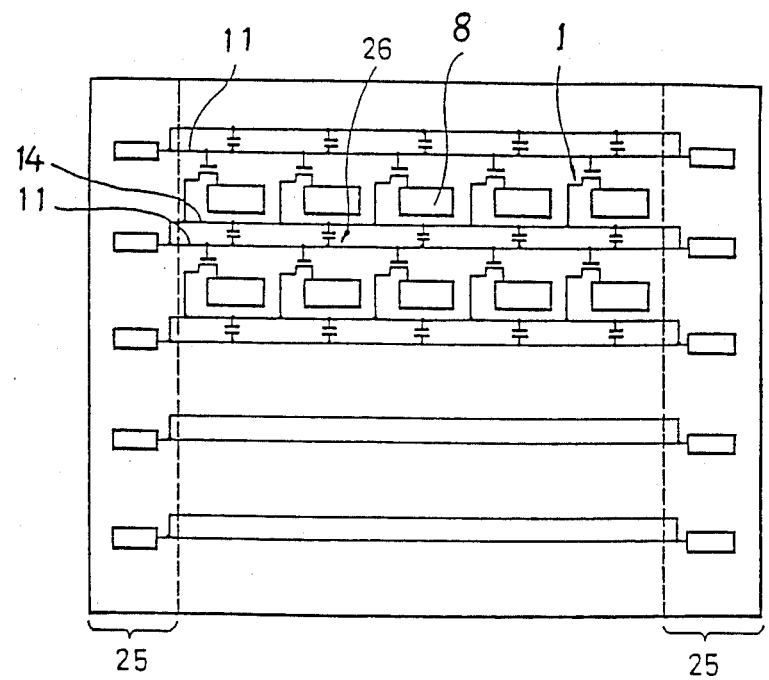
FIG. 10 shows a schematic arrangement of electrodes and bus lines of another embodiment of the present invention.
Figure 11:
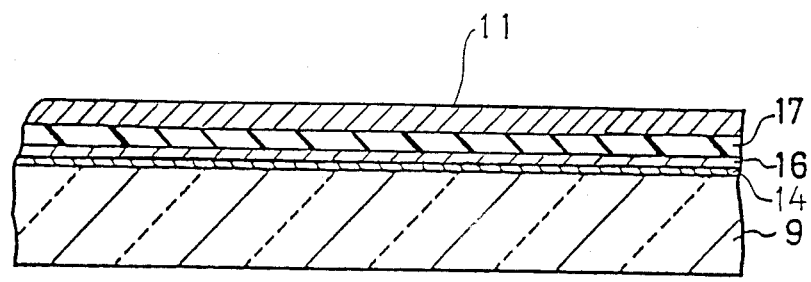
FIG. 11 shows a partial cross-sectional view along scan bus line of the structure shown in FIG. 10.

The equivalent circuit for the second modification is shown in FIG. 10, wherein the same reference numerals designate the same or similar parts. Scan bus line 11 and drain bus line 14 are not connected together, but they are insulated with each other within an effective display area on the panel and two bus lines 11 and 14 are connected on both peripheral regions 25 of the panel. In this case, a cross-sectional view taken along line B—B' of FIG. 6 is shown in FIG. 11.

Scan bus line 11 has distributed capacitances shown as condensors 26 in FIG. 10. This design is characterized in that scan bus line 11 can work well as normal, even when one break off accident of bus line or connection fault at one peripheral terminal might happen, because it is connected through another bus line taking a roundabout circuit.

Drain bus line 14 has comparatively higher resistance value than that of scan bus line 11, however, it is coupled capacitively with scan bus line. Then the drain current can flow in and flow out through the capacitance 26 connected to scan bus line 11 parallel with drain bus line 14, therefore, generation of rounded pulse waveform can be avoided.

Figure 12:
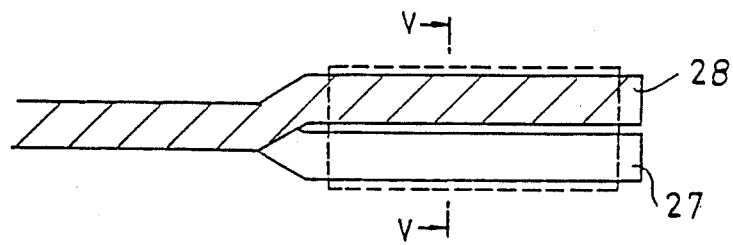
FIG. 12 shows a plan view of terminal configuration according to the embodiment of FIG. 10.
Figure 13:
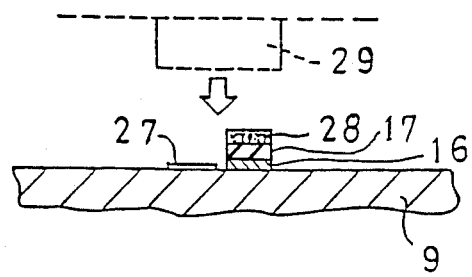
FIG. 13 shows a cross-sectional view taken along a line of V—V' in FIG. 12.

FIGS. 12 and 13 show the structures of scan bus line 11 and drain bus line 14 at the peripheral region of the panel. FIG. 12 shows a plan view, and FIG. 13 shows a cross-sectional view taken along line V—V of FIG. 12.

At the peripheral region of the panel, terminals 28 and 27 of scan bus line 11 and drain bus line 14 are branched off and their surfaces are exposed. Connector 29 is pressed for engagement (in the figure, it is shown schematically) and is used for connecting both two bus lines or receiving address pulses.

The structure of this type has a feature of that scan bus line 11 and drain bus line 14 can be connected to the separate power sources for test purpose.

If the peripheral regions 25 is covered during depositing process of amorphous silicon layer 16 and insulating layer 17, then scan bus line 28 (11) can be directly deposited on drain bus line 27 (14) in the peripheral regions 25. In this case, connections between two bus lines are automatically completed.

And next, the third modification of the panel design is explained. When the insulation fault through insulating layer 17 between gate electrode G and drain electrode D happens, then one scan bus line 11 connected to said gate electrode G and other scan bus line 11 connected to said drain electrode D interact with each other, and their voltages are influenced very much with each other. This fact causes a line defect in display. The third modification of design relates to alleviate the defect size.

Figure 14:
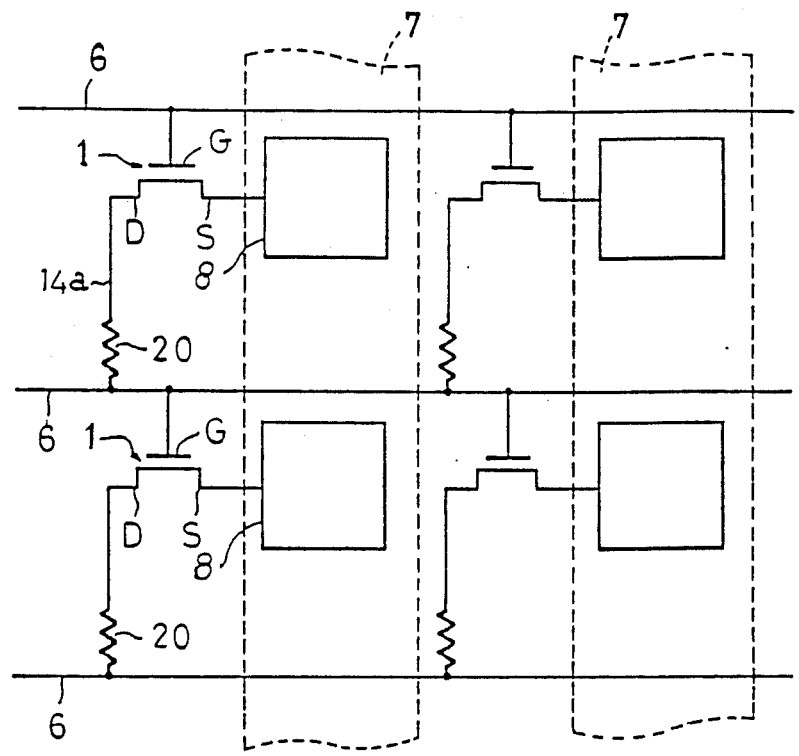
FIG. 14 shows an equivalent circuit for further modification of the present invention, wherein the drain electrode is connected to scan bus line through a resistor.

FIG. 14 shows an equivalent circuit for explaining the principle of the above modification. The figure is almost the same as FIGS. 3 or 5 except that drain electrode D is connected to scan bus line 6 through resistor 20. This resistor 20 prevents the above interaction between two adjacent scan bus lines. And the line defect is alleviated, and the defect is limited to single pixel in which the insulation fault of TFT occurs.

Fabrication method thereof is similar as that applied in FIGS. 6 to 9, however, as the transparent conductive material, Tin Oxide ($SnO_2$) layer having a thickness of 500 Å is used for deposition on glass panel. It has a sheet resistivity of about 50 Kilo-ohms per square. The deposited layer of Tin Oxide is then patterned, resulting in forming display electrode 8, source electrode S, drain electrode D, extension line 14a and drain bus line 14 when the double layer structure is adopted.

The extension line 14a has a high resistance of 1 Meg-ohms when its dimensions are selected as 10 $\mu$m width and 200 $\mu$m length. On the contrary, scan bus line 11 is formed using metal layer such as aluminum, therefore it is easy to obtain a low resistance such as 10 Kilo-ohms between two end terminals. The resistance ratio of scan bus line 11 to extension line 14a such as larger than 1:10 is sufficient for preventing the line defect. Therefore, if resistance value of scan bus line 11 is assumed to be 10 Kilo-ohms, value of 100 Kilo-ohms is enough for the extension line 14a.

When the resistance value of 1 Meg-ohms is adopted for the extension line 14a, the change of address pulse voltage, applied to the scan bus line having insulation fault of TFT, can be maintained within 1% of normal voltage, therefore, only single pixel having the insulation fault in TFT does not work well.

In this embodiment, display electrode 8 is also formed of Tin Oxide layer having a high sheet resistivity, however, this does not become a serious problem, because resistance value less than 10 Meg-ohms is sufficient to charge up the capacitance between two display electrodes within the addressing period, when the capacitance is assumed to be 1 pF.

Figure 15:
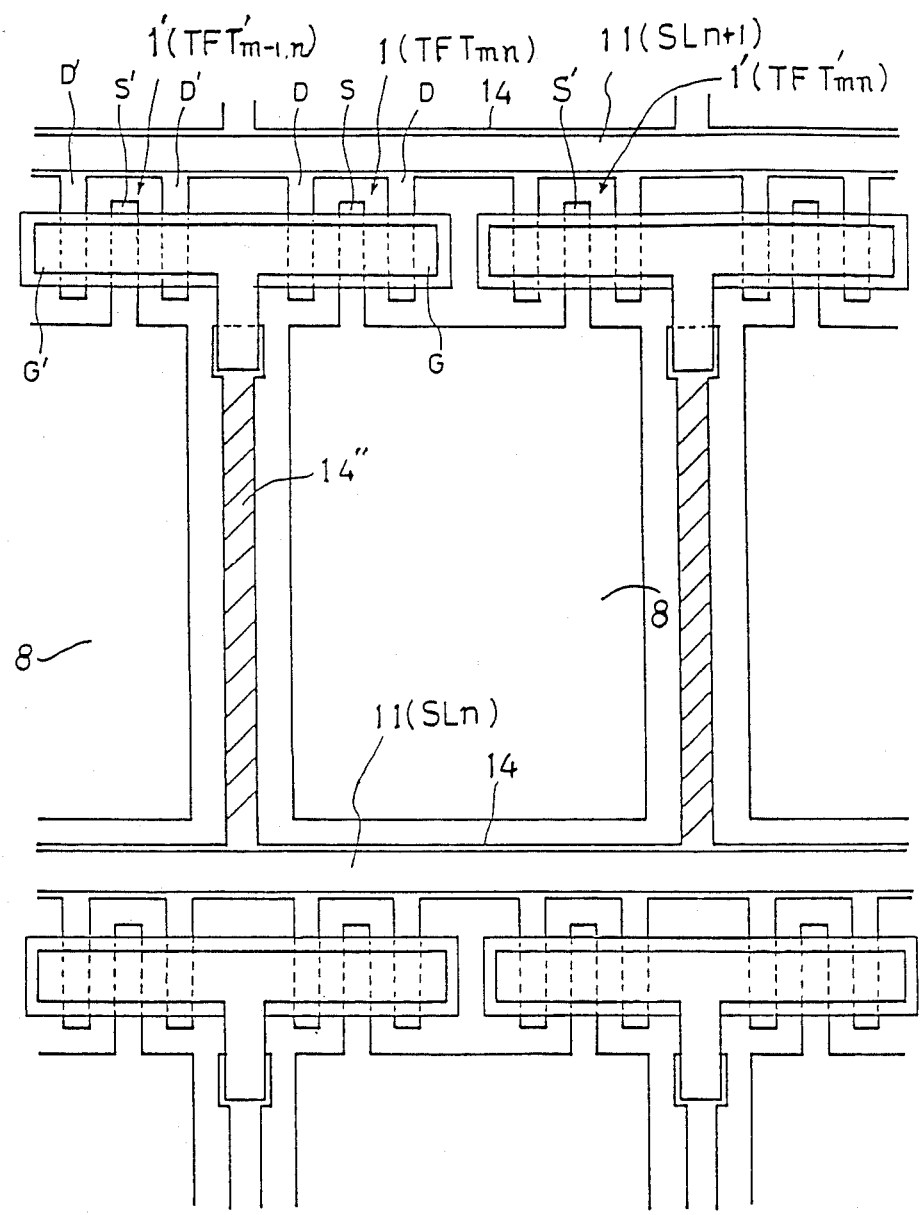
FIG. 15 shows a plan view of the electrode and bus line arrangement of still further modification of the present invention.

And next, the fourth modification of embodiments is explained. FIG. 15 shows a plan view of the electrode configuration having two TFTs 1 and 1' per pixel, and this configuration has a merit of providing redundancy for the display device. Its equivalent circuit is shown in FIG. 16.

Each display electrode 8 is connected to two source electrodes S and S' of TFTs 1 and 1' respectively. Two TFTs are complementary to each other. When either of TFTs has any defect, the other TFT works effectively. The electrode configuration having redundancy such as shown in FIG. 15 can be realized by a simple bus line arrangement without a crossover on the substrate. Scan bus line 11 (SLn, SLn+1) is connected to drain electrodes D, D' through lower bus line 14. And further, neighboring gate electrodes G and G' are connected to the adjacent scan bus line through extension line 14''.

Scan bus line 11 is made of metal layer and forms a double layer with the lower bus line 14 of transparent conductive material. On the other hand, extension line 14'' formed between gate electrodes G, G' and scan bus line 11 is also made of transparent conductive material such as ITO, therefore it has a resistance R such as 100 Kilo-ohms.

Figure 16:
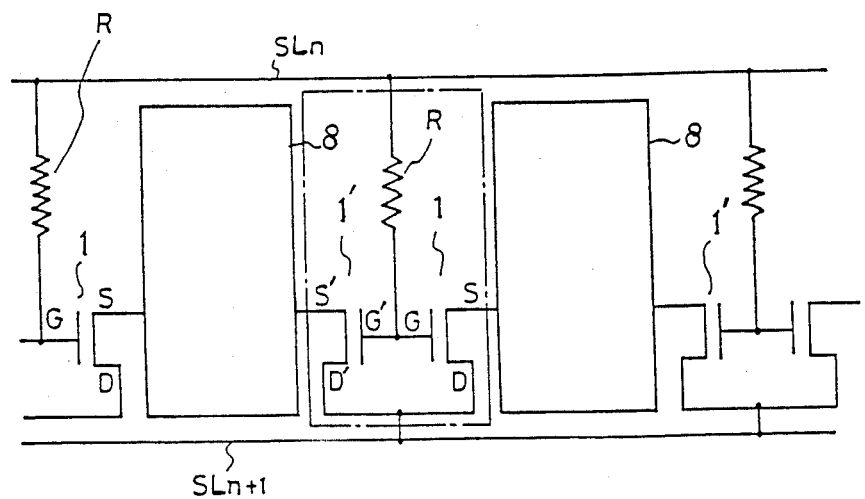
FIG. 16 shows an equivalent circuit for the embodiment shown in FIG. 15.

When any one of TFTs of FIG. 16 has a short between gate electrode and drain electrode, short current flows between adjacent scan lines SLn and SLn+1 through the resistor R as shown in FIG. 16. As a result, drain voltages of TFTs connected to the scan line shows a sharp change at the defective TFT and display brightness also shows a change, therefore, it is easy to specify the defective TFT. The defective TFT ca be cut-off by evaporating the connecting portion such as between drain electrode and scan bus line or extension line 14'' using laser radiation through the substrate. Display device can be thus repaired and works normal using other remaining TFT.

Of course, electrode configuration of this embodiment can be modified in such a way that drain electrodes D, D' are connected to the scan bus line through resistor R and gate electrodes G, G' are connected to adjacent scan bus line.

And next, the driving method for the active matrix display device above described is explained. The equivalent circuit of FIG. 3 is used again for explaining the principle.

TFT (its position in the matrix is represented as TFTmn) assumed to be off-state while a voltage between gate electrode 2 and drain/source electrodes $\frac{3}{4}$ is equal to or lower than 0 volts. This means that TFT 1 is a n-type enhancement transistor and a threshold voltage thereof is 0 volts. And due t the requirements of liquid crystal characteristics, the polarity of the voltage (data voltage) applied to display element Lmn should be reversed alternately every time when the scan bus line SLn, connected to TFTmn, is addressed. Address pulses such as Vg1, Vg2 and Vg3 shown on the left side of FIG. 3 are impressed to each scan bus line 6 sequentially synchronized with horizontal synchronizing signal, and data pulses such as Vd1 and Vd2 shown on the upper side of FIG. 3 are impressed to each data bus line 7 simultaneously for each horizontal scan period. The polarity of data voltage is reversed after scanning one frame. The address pulse has a stepped waveform having Vgoff, Vgc, and Vgon levels.

Figure 18:
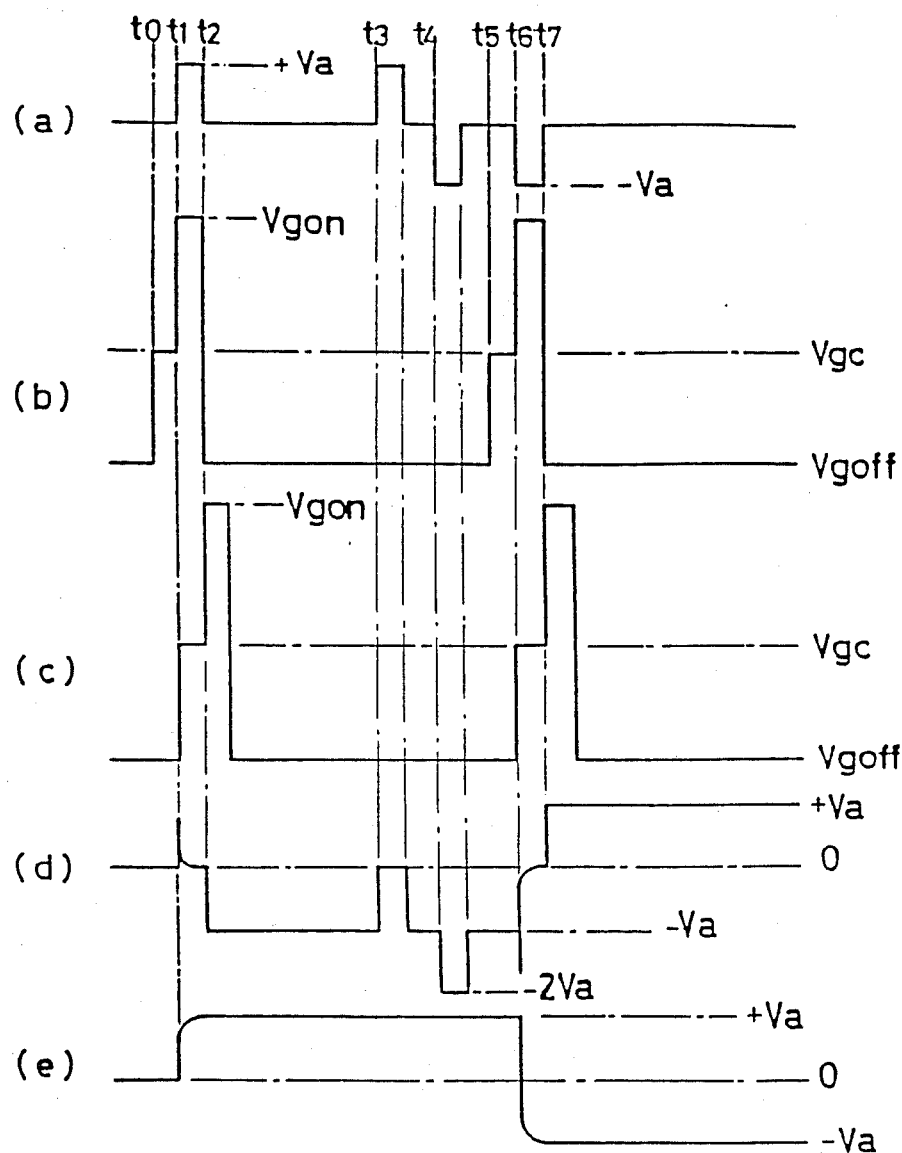
FIG. 18 shows waveforms during operation of the display device of the present invention, wherein (a) shows data pulses; (b) and (c), address pulses; (d), source voltage; and (e), voltage between display electrodes.

FIG. 18 shows a detailed voltage versus time chart illustrating; (a) data voltage to DLm, (b) and (c) address pulses to SLn and SLn+1, (d) display electrode potential Vpmn on TFTmn side, and (e) voltage across display electrodes of Lmn. Data voltage Va reverses its polarity to −Va at t6 as seen in FIG. 18(a), where (t6−t1) means one frame period; and t4 represents beginning of the first pulse of the next frame.

When address pulse shown in FIG. 18(b) is applied, for example, to scan bus line SLn, then address pulse of FIG. 18(c) is simultaneously applied to the next scan bus line SLn+1. Address pulse has three levels as described. When TFTmn is addressed at time t1, then its gate 2, connected to scan bus line SLn, is driven to Vgon; data bus line DLm, to Va; and its drain connected to SLn+1, to Vgc. To maintain the normal operation of display element according to the present invention, the following voltage relationship should be satisfied at all times;

$$Vgc - Vgoff \geq 2Va,$$

where threshold voltage Vth is assumed to be 0 volts.

The above condition means that regardless of the polarity of charged voltage between display electrodes and the polarity of data voltage, TFTmn is maintained at off-state for whole non-addressed period, and therefore the charged voltage between display electrodes are maintained. For example, if data voltage Va and −Va are selected as +5 volts and −5 volts respectively, Vgc−Vgoff should be larger than 10 volts. If Vgc is chosen as 0 volts, then Vgoff should be lower than −10 volts such as −12 volts.

When threshold voltage Vth has a finite value, the relationship is modified as follows;

$$Vgc - Vgoff \geq 2Va - Vth.$$

When TFTmn of FIG. 3 is addressed at t1, address pulses of FIGS. 18(b) and 18(c) are applied to scan bus lines SLn and SLn+1 respectively, and data pulse of FIG. 18(a) is applied to data bus line DLm. Then charging current flows into display element Lmn and the voltage across display electrodes builds up. The terminal voltage (shown as Vpmn in FIG. 3) shows a steep rise and a fall approaching 0 volts as shown in 18(d), and the charged voltage across display electrodes is shown in FIG. 18(e).

At time t2, TFTmn is turned off and data voltage is changed to zero. Voltage at Vpmn jumps to −Va level because of capacitive coupling between the display electrode and data bus line DLm, and charged voltage across display electrodes as shown in FIG. 18(e) is maintained almost constant for the subsequent period. During subsequent non-addressed period, data bus line DLm receives data voltage every time when other scan bus lines are addressed. Therefore non-addressed display element Lmn also receives effects of voltage change of data bus line DLm.

However in FIG. 18(e), charged voltage is simply shown as constant neglecting voltage fluctuation. When data pulse is assumed to have the waveform as shown in FIG. 18(a), wherein the pulse beginning at t3 shows the final data pulse of the first frame; and data pulse beginning t4, the first data pulse of the next frame, then the voltage Vpmn of FIG. 18(d) also shows two changes corresponding to the above two data pulses beginning at t3 and t4. At t3, Vpmn rises to 0 volts, and at t4, it drops to −2Va. It is seen that, when the polarity of data pulse changes, the maximum amplitude of Vpmn reaches to twice the data voltage. In order to maintain TFTmn at off-state for the Vpmn change, Vgc−Vgoff≧2Va is a necessary condition as described previously for normal operation of the display device.

At t6, TFTmn is addressed by the second pulses of FIGS. 18(b) and 18(c) respectively, and data pulse of −Va is applied to data bus line DLm. Then the terminal voltage Vpmn shows a steep drop momentary below −Va level, and approaches 0 level (Vgc) because TFTmn is conductive. The direction of charging current is opposite to that occurred at t1. Therefore charged voltage between display electrodes is also reversed to −Va level at t6 as shown in FIG. 18(e).

When data voltage is negative, gate voltage to make the TFT on-state ca be lower than the voltage for positive data voltage. Therefore, the waveform of address pulse can take different shapes depending on the polarity of data pulse.

Next, the improved driving method of display device according to the present invention is explained. By the previously explained method using FIG. 18, the polarity of data pulses is reversed alternately every frame. Charged voltage across display electrodes of FIG. 18(e) is shown as a constant line for most part of non-addressed period, however, in practical application, it is affected by data voltages during non-addressed period.

Generally the active matrix display device can not avoid the influences of leakage current and capacitance between electrodes. The voltage across display electrodes fluctuates during non-addressed period and this makes the transparency (in other word, brightness) of pixel thereof fluctuate. Data pulses of the same polarity for one frame period is more liable to such effects than the method of reversing the polarity every horizontal scan. This is already known method of driving the active matrix display device of the prior art.

The display device according to the present invention can also adopt the above method to maintain more correct display brightness, wherein the application method of data pulses is changed in such a way that the polarity of data voltage is reversed alternately every horizontal scan and the polarity to each pixel is further reversed every frame.

Figure 17:
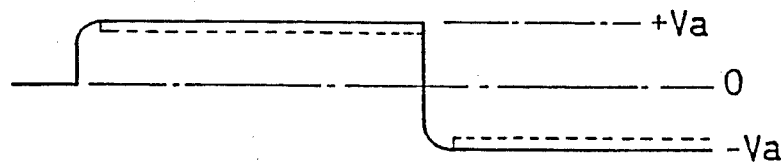
FIG. 17 shows a voltage fluctuation between display electrodes for non-addressed period due to impressed data pulses.

Even when the above method is applied, there remains fluctuation of the voltage across display electrodes. This is shown in FIG. 17 which corresponds to FIG. 18(e). FIG. 17 shows the voltage fluctuates between the solid line and the dashed line.

The electrode structure of the present invention is more susceptible to data voltage change than those of the prior art, because display element is connected to scan bus lines through two capacitances in parallel, one being gate-to-source capacitance; and second, source-to-drain capacitance.

To avoid the above fluctuation of the display brightness and keep it at correct values, an improved driving method will be disclosed hereinafter.

Figure 19:
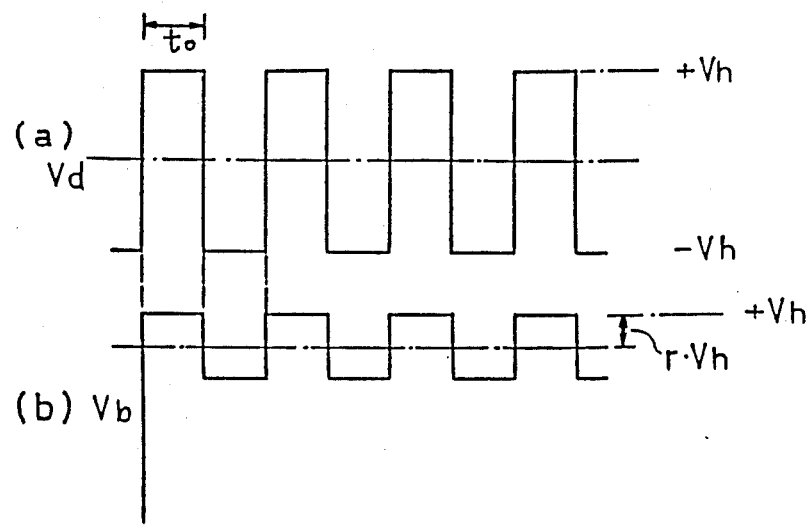
FIGS. 19 and 20 show effects of data voltage to display electrode voltage, wherein (a) shows data voltage waveform which alternately reverses its polarity every horizontal scan, and (b) shows the voltage variation of display electrode on the second panel due to the data voltage change.
Figure 20:
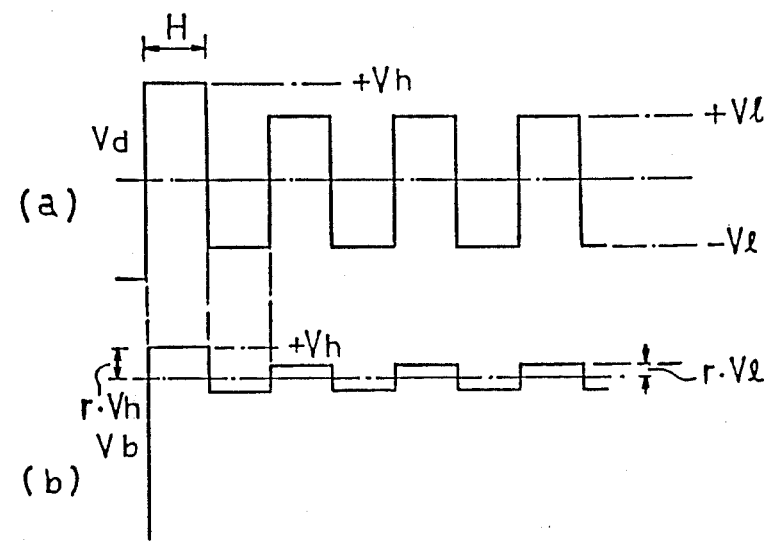

FIG. 19 shows waveforms of; (a) alternate data pulse Vd, and (b) voltage change (Vb) across display electrodes for the specific pixel addressed. At first, the pixel is addressed and driven to Vh or level [1] (for example, white level), and then for all subsequent non-addressed period, the pixel receives effects of alternate voltage change of $-Vh$ and $Vh$, both representing level [1]. FIG. 20 shows the similar waveforms Vd and Vb as FIG. 19 except that data pulse Vd changes from Vh to $-V1$ and then to $V1$ alternately or all [0] level (black) for the subsequent non-addressed period.

The voltage Vb receives the effects of data pulses Vd and it changes its waveform as shown FIGS. 19(b), and FIG. 20(b). When r is assumed as an influence factor of pulse voltage Vd to voltage Vb, it is less than 1, and then amplitude of Vb shows a fluctuation having an amplitude of rVh in FIG. 19(b) or rV1 in FIG. 20(b).

The brightness of liquid crystal display depends on the effective voltage (Vb rms) applied across the liquid crystal display element.

For the case of FIG. 19(b), effective voltage Vb rms is given by the following equation;

$$Vb\ rms = \sqrt{\frac{\int [V(t)]^2 dt}{\int dt}} \qquad (1)$$

$$\approx \sqrt{\frac{\frac{1}{2}nt_oVh^2 + \frac{1}{2}nt_o(Vh - 2rVh)^2}{nt_o}}$$

$$= \sqrt{\frac{1}{2}Vh^2(2 - 4r + 4r^2)}$$

$$= Vh\sqrt{1 - 2r + 2r^2},$$

where n denotes number of scan lines; and $t_o$, time of one horizontal scan.

And for the case of FIG. 20(b), the effective voltage Vb′ rms is given by the following equation;

$$Vb'\ rms = \sqrt{\frac{t_oVh^2 + \frac{1}{2}(n-1)t_o(Vh - rVh + rV1)^2 + \frac{1}{2}nt_o(Vh - rVh - V1)^2}{nt_o}} \qquad (2)$$

$$\approx \sqrt{\frac{1}{2}[Vh(1-r) + rV1]^2 + \frac{1}{2}[Vh(1-r) - rV1]^2}$$

$$= Vh\sqrt{(1-r)^2 + (Vh/V1)^2 r^2}$$

The difference $\Delta V$ rms between Vb rms and Vb′ rms is given as follows;

$$\Delta V\ rms \approx \frac{r^2 Vh(1 - V1^2/Vh^2)}{2\sqrt{1 - 2r + 2r^2}} \qquad (3)$$

$$= \frac{r^2}{2Vh\sqrt{1 - 2r + 2r^2}} *(Vh - V1)(Vh + V1)$$

In order to obtain equal brightness for both cases of FIGS. 19 and 20, the difference $\Delta V$ rms of equation (3) is to be minimized. The driving method therefor is disclosed hereinafter.

Figure 21:
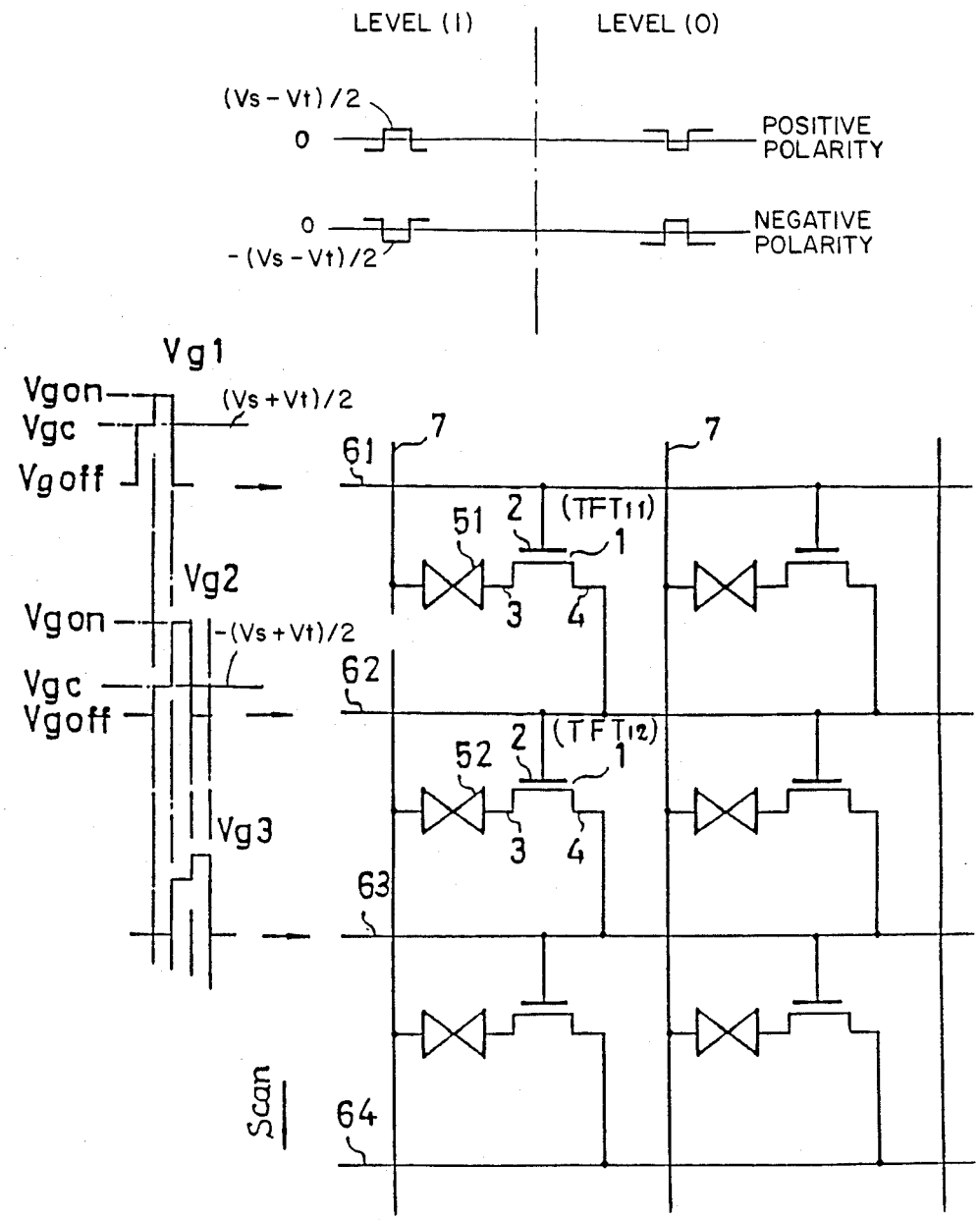
FIG. 21 shows an equivalent circuit and waveforms of address pulses and data pulses for explaining the principle of driving method in order to reduce uneven contrast and to obtain stable contrast gradient.

FIG. 21 shows the same equivalent circuit as FIG. 3, and waveforms of address pulses on the left side and data pulses on the upper side, waveforms being different from those shown in FIG. 3. Each time when scan bus line 61, 63 of the odd number is addressed, data voltage of positive polarity is applied, and each time when a scan bus line of the even numbers is addressed, data voltage of negative polarity is applied. Waveforms of data voltage are shown for both display levels [1] and [0] in accordance with its polarity.

With regard to address pulse during TFT11 is addressed, pulse voltage Vgon of waveform Vg1 is impressed to scan bus line 61 and voltage of drain electrode 4 of TFT11 connected to scan bus line 62 is maintained at voltage Vgc of waveform Vg2.

Vgc levels of address pulse is different depending on the polarity of data pulses. According to the driving method of the present invention, the absolute value of Vgc is determined as the values of between the saturation voltage and threshold voltages of liquid crystal display element.

Figure 22:
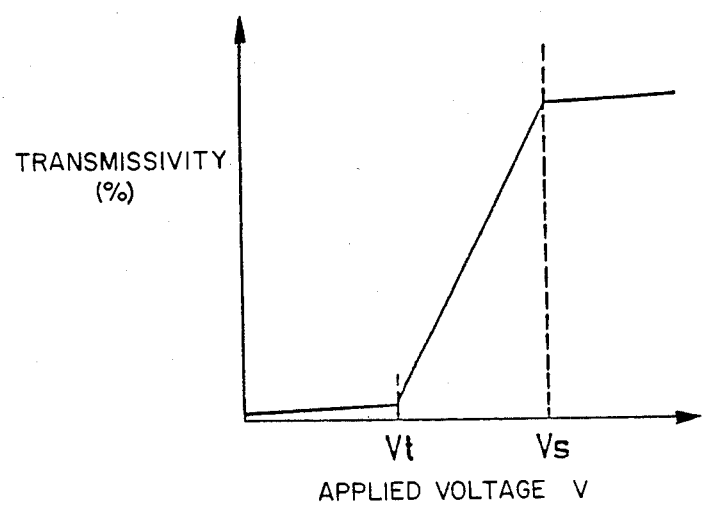
FIG. 22 shows a transmissivity characteristic of liquid crystal cell as a function of applied voltage.

Transmissivity characteristic versus applied voltage for liquid crystal is shown in FIG. 22. Vt denotes the threshold voltage; and Vs, the saturation voltage of liquid crystal display element. In other words, it may be considered that Vs means the applied voltage of display element for level [1]; and Vt, for level [0].

And next, conditions for minimizing the brightness fluctuation are explained. Assume that Vgc of pulse Vg1 for positive data in FIG. 21 is selected as (Vs+Vt)/2 and Vgc of Vg2 is selected as −((Vs+Vt)/2 for negative data pulse. And amplitudes of data pulses are selected as (Vs−Vt)/2 and −(Vs−Vt)/2 as shown on the upper side of FIG. 21 depending on display level and the polarity of data voltage.

When positive data voltage (Vs−Vt)/2 for level [1] is applied to display element 51, and drain of TFT11 is held at voltage of −(Vs+Vt)/2, then voltage across display element becomes Vs. When positive data voltage −(Vs−Vt)/2 for level [0] is applied, then voltage across display element becomes Vt.

When negative data voltage −(Vs−Vt)/2 for level [1] is applied to display element 52, and drain of TFT12 is held at voltage of (Vs+Vt)/2, then voltage across display element becomes −Vs. When negative data voltage (VS−Vt)/2 for level [0], then voltage across display element becomes −Vt.

Therefore, for data pulses of level [1] of positive and negative polarities, display element is driven to saturation voltages Vs and −Vs respectively; and for data pulses of level [0], Vt and −Vt.

In this case, the difference of the effective voltages $\Delta V$ rms of equation (3) is obtained by substituting (Vs−Vt)/2 for Vh, and −(Vs−Vt)/2 for Vl. The last term of equation (3), namely (Vh+Vl), becomes zero.

Actual waveform pattern of data pulse is different from FIG. 20(a), and it shows the waveform pattern of data pulse which begins at level [1] similarly with regard to the first pulse, however, the polarities of the second and all following pulses for non-addressed period of level [0] are reversed and their amplitudes are the same as the first pulse.

The driving method above described has feature in that data voltages have the same amplitude for both levels [1] and [0] and voltage fluctuation across the display elements is made smaller.

Figure 23:
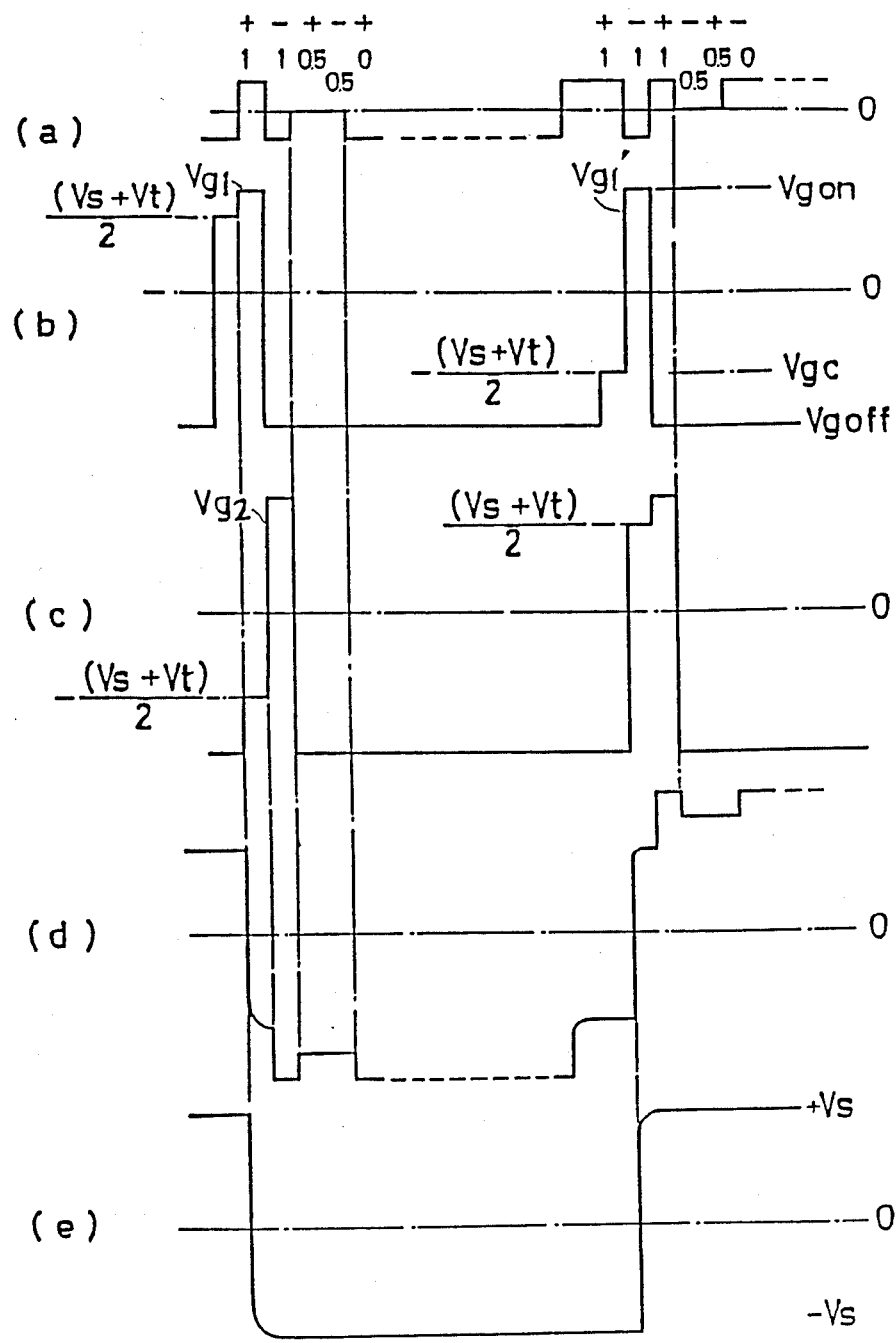
FIG. 23 shows waveforms of data pulses, address pulses, display electrode voltage, and voltage across display electrodes utilizing the driving method of the present invention.

FIG. 23 shows voltage versus time chart for the embodiment of the above driving method, wherein (a) shows data pulses for data bus line DLm; (b) and (c), address pulses for scan bus lines SLn and SLn+1; (d), display electrode voltage on TFTmn side; and (e), voltage across display electrodes Lmn. Numerals +1 and −1 in FIG. 23(a) denotes level [1] data for positive and negative polarities respectively. Numerals +0.5 and −0.5 denotes intermediate level between level [1] and [0] for positive and negative polarities respectively. And numerals +0 and −0 denotes level [0] data for positive and negative polarities respectively.

The amplitudes of data pulses for levels [1] and [0] are selected as (Vs−Vt)/2 or '(Vs−Vt)/2 depending on the polarity as explained in FIG. 21. With regard to the address pulse shown in FIG. 23(b) applied to scan bus line SLn, the first pulse Vg1 corresponds to positive data pulse and the second pulse Vg1' corresponds to negative data pulse after one frame period.

When TFTmn is addressed by the first pulse of Vg1, its drain connected to SLn+1 is driven to Vgc having an amplitude of −(Vs+Vt)/2 as shown in FIG. 23(c). Display element is charged with the voltage Vs, and is maintained for subsequent one frame period. It is shown in FIG. 23(e), and it shows potential of the display electrode on TFT side is negative.

And next when scan bus line SLn+1 is addressed, negative data pulse −(Vs−Vt)/2 of level [1] is applied, and the drain of TFTmn+1 is driven to (Vs+Vt)/2, then display element is charged with the voltage −Vs.

For displaying brightness of middle level between [1] and [0] levels, data voltage is selected as the middle value between (Vs−Vt)/2 and −(Vs−Vt)/2, namely, 0 volts.

Figure 24:
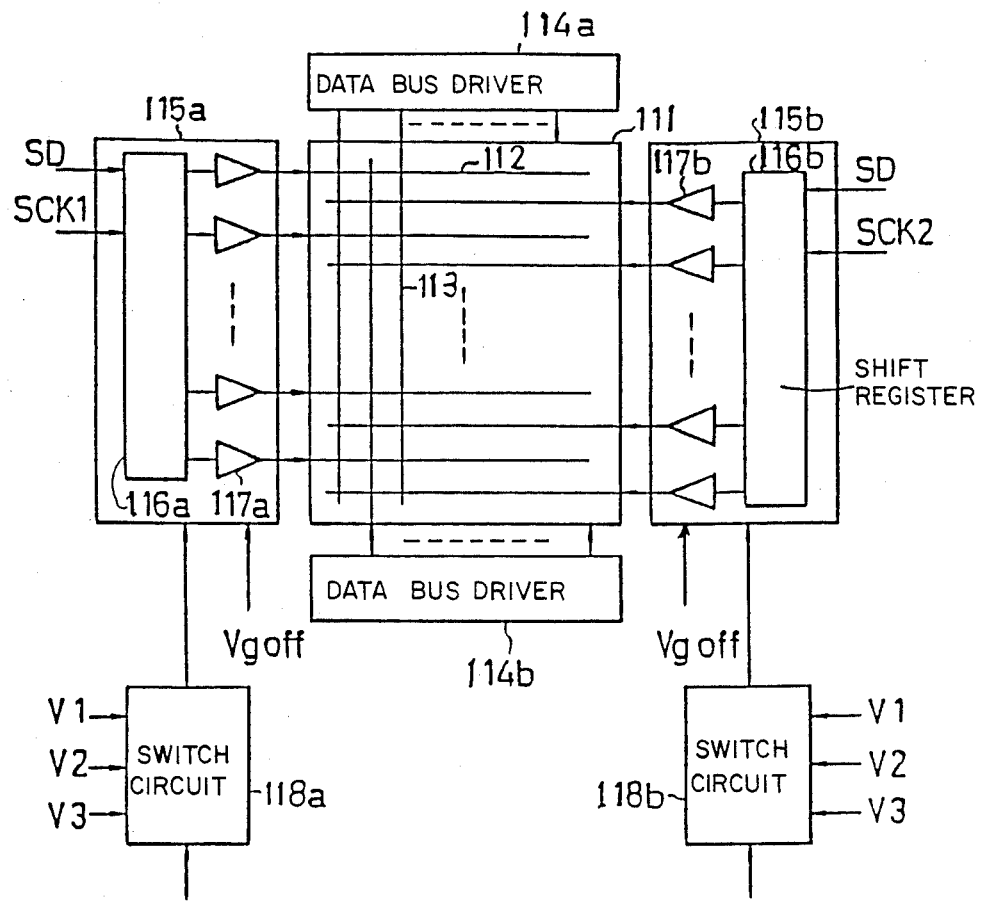
FIG. 24 shows a block diagram for driving the display device according to the present invention.

The embodiment of FIG. 24 shows a block diagram of the driving method according to the above embodiment. Scan bus lines 112 of active matrix display device 111 of the present invention are addressed by scan bus drivers 115a and 115b, and data pulses are applied to data bus lines 113 by data bus drivers 114a and 114b. Each scan bus driver 115 comprises shift register 116 and buffer amplifier 117, and is operatively connected to switching circuit 118.

Display data corresponding to single horizontal scan line are stored in data bus drivers 114a and 114b, and outputted to data bus lines 113 synchronized with the address pulse outputted sequentially to scan bus line 112 from scan bus drivers 115a and 115b. Switching circuits 118a and 118b are connected to power sources V1, V2 and V3. And Vgoff is separately supplied to scan bus drivers. Vgon, which makes the active element (TFT, not shown in FIG. 24) conductive, is supplied from V1. Vgc having a voltage of (Vs+Vt)/2 is supplied from V2, and Vgc having a voltage of −(Vs+Vt)/2 is supplied from V3. These voltages are selectively switched in switching circuits 118a and 118b and outputted selectively to the scan bus line 112 through buffer amplifiers 117a and 117b. The voltage sources for Vgoff are separately provided to each scan bus driver 115, and maintain the voltage of scan bus lines at Vgoff for non-addressed period.

Figure 25:
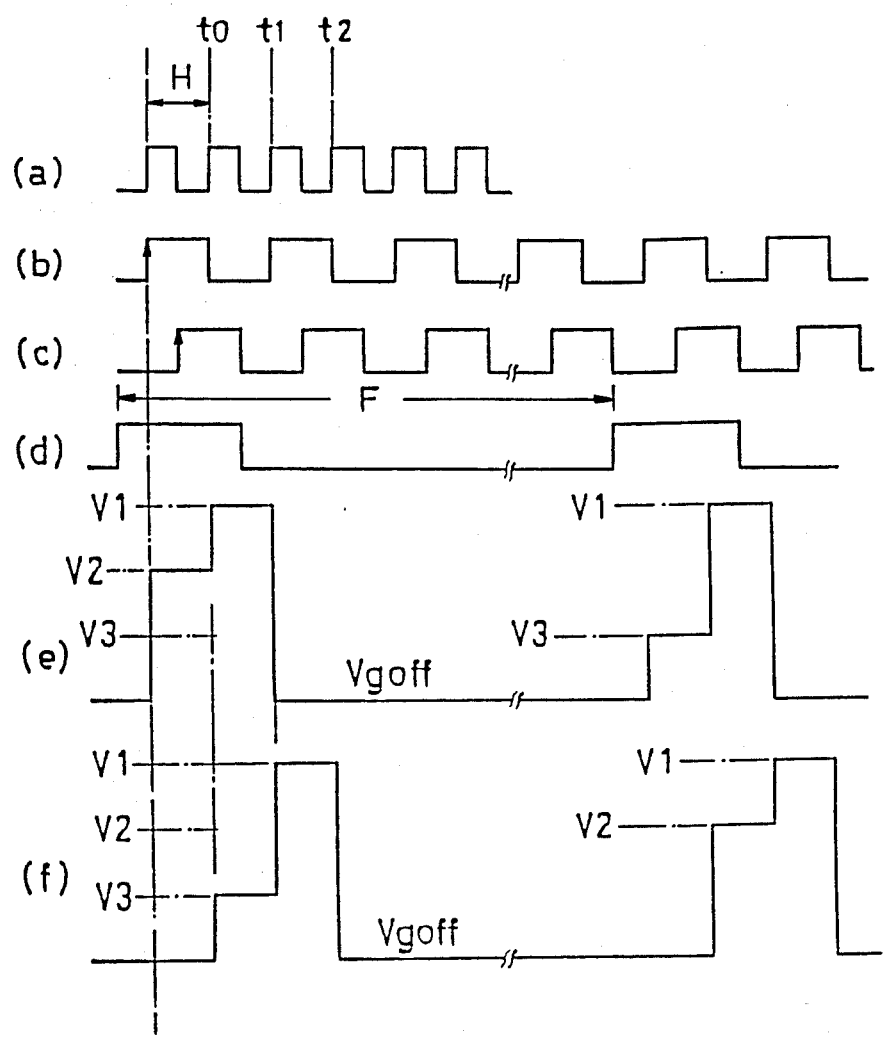
FIG. 25 shows voltage versus time chart of clock signal, shift clock pulses, shift data, and address pulses of FIG. 24.

FIG. 25 shows a waveform versus time chart for the embodiment of FIG. 24. In the figure, (a) shows horizontal clock signal; (b), first shift clock signal SCK1; (c), second shift clock signal SCK2; (d), shift data SD; and (e) and (f), address pulses from scan bus drivers 115a and 115b respectively.

Clock signal (a) has period H which corresponds to one horizontal scan period. The first and second shift clock signals SCK1 and SCK2 have a phase difference of H/2 with each other, and shift data SD has one frame period F.

On time t0, the first scan bus line 112 is driven by V1 having voltage of Vgon by scan bus driver 115a connected to switching circuit 118a, and at the same time, the next scan bus line is driven by V3 having voltage of −(Vs+Vt)/2 by scan bus diver 115b connected to switching circuit 118b. This is shown in the region between t0 and t1 of FIGS. 25(e) and 25(f). Data voltages of positive polarity corresponding to the first scan bus line are also supplied to data bus lines 113 during this period.

On time t1, the first scan bus line is driven to Vgoff by scan bus driver 115a, and the second scan bus line is driven to Vgon by scan bus driver 115b, and the third scan bus line is driven to (Vs+Vt)/2 (waveform is not shown in the figure) by scan bus driver 115a which is connected to V2 through switching circuit 118a. During the period between t1 and t2 of FIG. 25, data pulses of negative polarity corresponding to the second scan bus line is supplied to data bus lines 113.

In the above explanation, horizontal scan progresses from top to bottom sides. This can be reversed by applying address pulses from bottom to top sides and by changing the connections of gate electrode and drain electrode of TFTs, for example, by connecting gate electrode 2 of TFT11 to scan bus line 62 and drain electrode 4 of TFT11 to scan bus line 61 in FIG. 21.

What is claimed is:

1. An active matrix display device, comprising:
   first and second substrates having a peripheral region, forming an enclosure with no ground bus lines and a plurality of display elements arranged in a matrix and having first and second inside surfaces, respectively;
   data bus lines formed on the first inside surface, arranged in a first strip pattern and forming a first matrix of first display electrodes of the display elements having row and column positions, said data bus lines having ends at the peripheral region operatively connectable to receive pulses;
   scan bus lines formed on the second inside surface, arranged in a second strip pattern perpendicular to said data bus lines, forming a second matrix of second display electrodes of the display elements, said scan bus lines having ends at the peripheral region operatively connectable to receive pulses, said second matrix having row and column positions corresponding to said first matrix; and
   switch elements formed on the second inside surface, each of said switch elements corresponding to one of said second display electrodes having a control electrode and first and second controlled electrodes, the control electrode being connected to one of said scan bus lines, the first controlled electrode being connected to a corresponding one of said second display electrodes and the second controlled electrode being connected to a next one of said scan bus lines.

2. An active matrix display device according to claim 1, wherein said first and second substrates comprise liquid crystal.

3. An active matrix display device according to claim 1, wherein said second substrate further comprises additional bus lines, each being formed, parallel, adjacent and operatively connected at the peripheral region to a corresponding adjacent one of said scan bus lines.

4. An active matrix display device according to claim 3, wherein each of said additional bus lines includes connections to the corresponding adjacent one of said scan bus lines for each of said second display electrodes.

5. An active matrix display device according to claim 1, wherein said second substrate further comprises film resistors made of high sheet resistivity material, and wherein each of the second controlled electrodes is connected to the next one of said scan bus lines through a one of said film resistors.

6. An active matrix display device according to claim 5, wherein said film resistors have a resistance more than ten times greater than a resistance of a total horizontal length of a one of said scan bus lines.

7. An active matrix display device according to claim 3, wherein said second substrate further comprises an insulating layer formed between said additional bus lines and said scan bus lines.

8. An active matrix display device according to claim 7, wherein said additional bus lines are connected to said scan bus lines at the peripheral region of said second substrate.

9. An active matrix display device according to claim 1, wherein said switch elements comprise thin film transistors, each having a gate electrode as the control electrode, a source electrode as the first controlled electrode, and a drain electrode as the second controlled electrode.

10. An active matrix display device according to claim 1, wherein said first and second display electrodes, the connection between the first controlled electrode and the corresponding one of said second display electrodes and the connection between the second controlled electrode and the next one of said scan bus lines, each comprises a thin film of transparent and electrically conductive material.

11. An active matrix display device according to claim 1 wherein said scan bus lines comprise a metal layer.

12. An active matrix display device according to claim 11, wherein said metal layer comprises aluminum.

13. An active matrix display device according to claim 10, wherein said thin film of transparent and electrically conductive material comprises indium tin oxide.

14. An active matrix display device according to claim 5, wherein said high sheet resistivity material comprises tin oxide.

15. An active matrix display device according to claim 7, wherein said insulating layer includes at least one of silicon oxide and silicon nitride.

16. An active matrix display device according to claim 1, wherein each of said switch elements comprises a pair of transistors having thin film resistors, formed on said second substrate at each of said second display electrodes, each of said pairs having control electrodes connected to a same one of said scan bus lines through ones of the thin film resistors, first controlled electrodes connected to the corresponding one of said second display electrodes and second controlled electrodes connected to the next one of said scan bus lines.

17. A method of driving an active matrix display device having first and second substrates forming an enclosure with no ground bus lines and a plurality of display elements arranged in a matrix, data bus lines formed on an inside surface of said first substrate arranged in a strip pattern and forming a first matrix of first display electrodes of the display elements having row and column positions, said data bus lines having ends at a peripheral region of said first and second substrates operatively connectable to receive pulses, scan bus lines formed on an inside surface of said second substrate, arranged in a direction perpendicular to said data bus line lines forming a second matrix of said second display electrodes of the display elements having row and column positions corresponding to the first matrix, and having ends at the peripheral region of said first and second substrates connectable to receive pulses, switch elements connected to each of said second display electrodes, each having a control electrode and first and second controlled electrodes, the control electrode being connected to one of said scan bus lines, the first controlled electrode being connected to one of said second display electrodes and the second controlled electrode being connected to a next one of said scan bus lines, said method comprising the step of:
   sequentially applying address pulses to said scan bus lines, having a stepped waveform of a first voltage level during a non-addressed period, a second voltage level during a scanning period and a third voltage level during an addressing period, wherein a first voltage difference between said second voltage level and said first voltage level is greater than or equal to a second voltage difference between a peak-to-peak value of data pulses and a threshold voltage of said switch elements.

18. A method of driving an active matrix display device according to claim 17, wherein said method further comprises the step of:
applying a data pulse to one or more of said data bus lines at a beginning of a frame period, said data pulse reversing polarity at a next frame period.

19. A method of driving an active matrix display device according to claim 17, wherein said method further comprises the step of:
applying at least a pair of data pulses of opposite polarities to one or more of said data bus lines during each frame period.

20. A method of driving an active matrix display device according to claim 19, wherein said method further comprises the step of:
applying said second voltage level to a scan bus line as an intermediate voltage value between a display element saturation level and, a display element threshold level in order to maintain a saturation state in an addressed display element of the scan bus line and initiate a threshold state in an adjacent display element of a next scan bus line.

* * * * *